(12) United States Patent
Spencer

(10) Patent No.: US 8,250,385 B2
(45) Date of Patent: Aug. 21, 2012

(54) METHOD AND SYSTEM OF DISSIPATING POWER FROM A POWER SUPPLY

(75) Inventor: John R. Spencer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 654 days.

(21) Appl. No.: 12/363,703

(22) Filed: Jan. 30, 2009

(65) Prior Publication Data

US 2010/0199111 A1    Aug. 5, 2010

(51) Int. Cl.
G06F 1/00 (2006.01)
(52) U.S. Cl. .................. 713/300; 713/340; 320/135
(58) Field of Classification Search .................. 713/300, 713/330, 340; 323/282, 351; 320/162, 163, 320/126, 127, 134, 135, 136; 327/309, 327, 327/427, 143
See application file for complete search history.

(56) References Cited

U.S. PATENT DOCUMENTS

| | | | | |
|---|---|---|---|---|
| 3,721,887 A * | 3/1973 | Nickerson | ................... | 320/136 |
| 4,237,385 A * | 12/1980 | Jurgens et al. | ................. | 307/66 |
| 4,327,298 A * | 4/1982 | Burgin | ............................ | 307/66 |
| 4,706,274 A * | 11/1987 | Baker et al. | .................... | 455/462 |
| 4,876,709 A * | 10/1989 | Rogers et al. | ............. | 455/575.7 |
| 4,885,521 A * | 12/1989 | Crampton | ..................... | 320/126 |
| 5,140,511 A * | 8/1992 | Lee et al. | ................... | 363/21.07 |
| 5,151,614 A * | 9/1992 | Yamazaki et al. | ............ | 327/143 |
| 5,177,426 A * | 1/1993 | Nakanishi et al. | ............ | 320/134 |
| 5,179,337 A * | 1/1993 | Staarman et al. | ............. | 320/136 |
| 5,399,956 A * | 3/1995 | DeLuca et al. | ................. | 323/222 |
| 5,477,124 A * | 12/1995 | Tamai | ............................ | 320/135 |
| 5,572,735 A * | 11/1996 | Tanikawa | ...................... | 713/300 |
| 5,900,768 A * | 5/1999 | Price | ............................. | 327/427 |
| 5,905,646 A * | 5/1999 | Crewson et al. | .............. | 363/132 |
| 6,021,051 A | 2/2000 | Laskai et al. | | |
| 6,182,230 B1 * | 1/2001 | Gholami et al. | .............. | 713/300 |
| 6,274,949 B1 * | 8/2001 | Lioux et al. | ..................... | 307/64 |
| 6,275,391 B1 | 8/2001 | Laskai et al. | | |
| 6,522,034 B1 * | 2/2003 | Nakayama | .................... | 307/130 |
| 7,028,194 B2 * | 4/2006 | Forbes et al. | ................. | 713/300 |
| 7,120,805 B2 * | 10/2006 | Alperin et al. | ................ | 713/300 |
| 7,405,539 B2 * | 7/2008 | Chen | ............................. | 320/162 |
| 7,519,135 B2 * | 4/2009 | Staszewski et al. | ........... | 375/346 |
| 7,546,479 B2 * | 6/2009 | Saputro et al. | ................ | 713/330 |
| 7,616,421 B2 * | 11/2009 | Hickam | ....................... | 361/93.1 |

(Continued)

OTHER PUBLICATIONS

Kainka, B. SuperCap Battery. Power from a GoldCap. Elektor Electronics. Oct. 2003.*

(Continued)

*Primary Examiner* — Matthew D Spittle

(57) ABSTRACT

Dissipating power from a power supply. At least some of the illustrative embodiments are motherboards including a printed circuit board configured to couple to a main processor (and the printed circuit board configured to couple to a main power signal and an auxiliary power signal of a power supply), and a power dissipation circuit on the printed circuit board. The power dissipation circuit is configured to detect that the main power signal has powered-off, and responsive to the detection dissipate power from the auxiliary power signal for a predetermined amount of time less than an amount of time needed to fully discharge the auxiliary power signal in the absence of alternating current (AC) power to the power supply.

11 Claims, 2 Drawing Sheets

U.S. PATENT DOCUMENTS

| | | | | |
|---|---|---|---|---|
| 7,710,099 B2* | 5/2010 | Xiong | | 323/351 |
| 7,843,088 B2* | 11/2010 | Perper et al. | | 307/140 |
| 7,917,779 B2* | 3/2011 | Xiong | | 713/300 |
| 2004/0166797 A1* | 8/2004 | Thrasher et al. | | 454/290 |
| 2006/0117168 A1* | 6/2006 | Wang et al. | | 713/1 |
| 2010/0211811 A1* | 8/2010 | Zhou et al. | | 713/330 |
| 2010/0277146 A1* | 11/2010 | Zhou et al. | | 323/282 |

OTHER PUBLICATIONS

Simonet, Jean-Louis. DS54 Capacitor Discharge Driver. 2000.*

York, Bob. Transistor Switching Circuits. ECE 2B Lab #4. 2007.*

Chen et al. Where Does the Power Go in a Computer System: Experimental Analysis and Implications. IEEE. 2011.*

* cited by examiner

METHOD AND SYSTEM OF DISSIPATING POWER FROM A POWER SUPPLY

BACKGROUND

Computer systems use power supply units that create power signals in two categories: main power signals; and auxiliary power signals. The main power signals are selectively powered-on and powered-off within the power supply, while the auxiliary power signals remained powered-on at all times when the power supply is coupled to an alternating current (AC) power source. Power supplied from the auxiliary power signals operates devices on the motherboard used to detect user requests to wake the computer system (e.g., from one or more low power sleep states) and command powering-off and powering-on of the main power signals.

Some computer systems are programmed to take specific action on AC power loss, such as an automatic re-boot on AC power loss. Computer systems detect loss of AC power by way detecting loss of the auxiliary power signals. However, as power capacities of power supply units has increased, and the efficiency of the circuits on motherboard that draw power from the auxiliary power signals has likewise increased, in some cases the amount of time a motherboard takes to draw down the auxiliary power signal after AC power loss is longer than the AC power loss itself. Thus, the motherboard may not detect that AC power has been lost and restored, and the desired specific action after AC power loss may not take place.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Return" in reference to an electrical signal shall mean a return path for electrical current. A return path may be an earth ground, or an electrical common that is "floated" with respect to earth ground.

"Shorting", in relation to removing stored energy from a power supply, shall mean electrically coupling a power signal to a return by way of a low resistance current path and no information is created and/or modified by way of the low resistance current path. The short created in the process of shorting shall still be considered present in spite of the fact that the one or more shorting devices have non-zero terminal-to-terminal impedance (e.g., transistor operated in its active region). Moreover, binary and/or analog computations performed in relation to controlling the one or more shorting devices (e.g., feedback control of a shorting transistor) shall not obviate the status as shorting.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
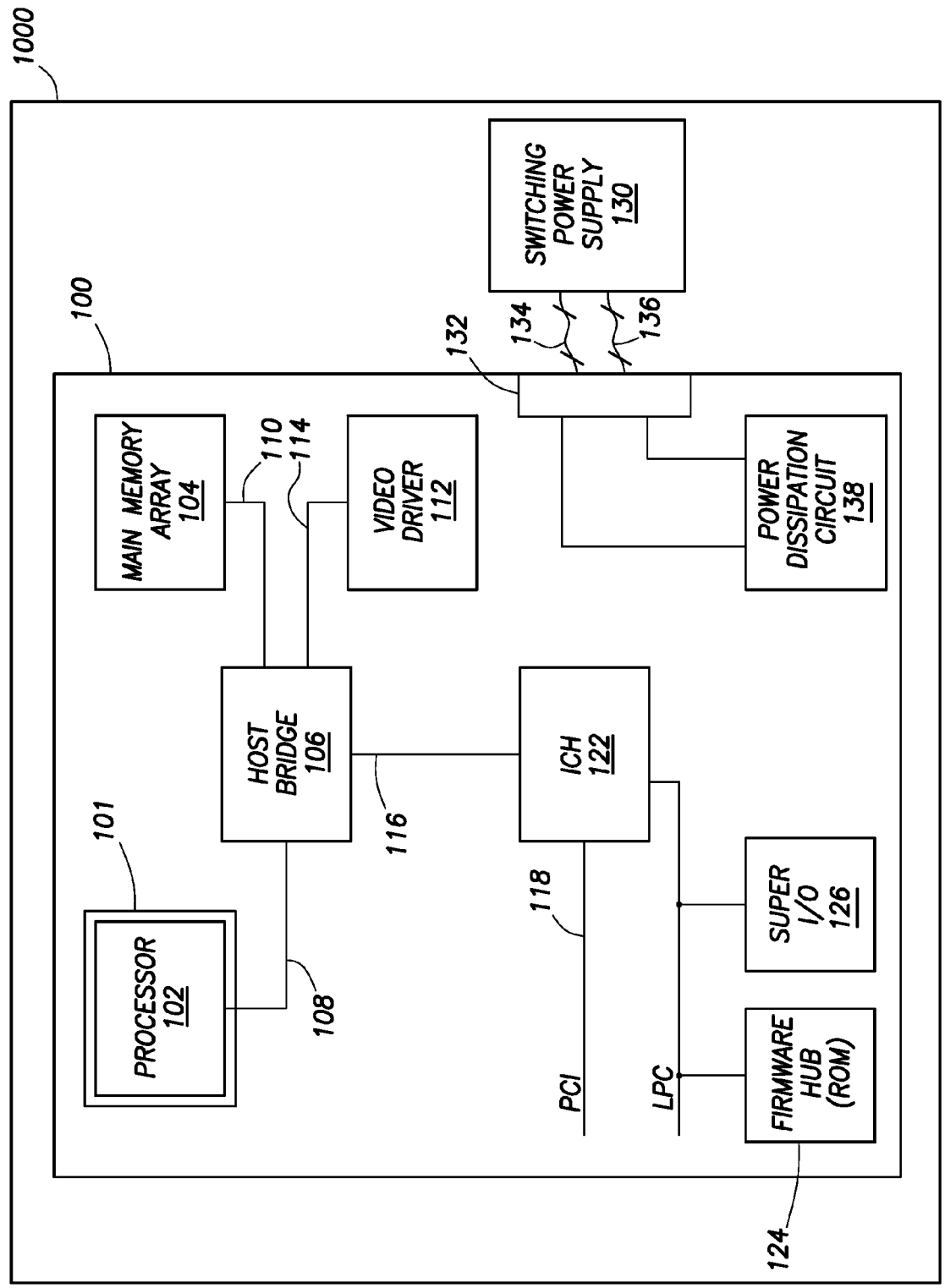
FIG. 1 shows a system in accordance with at least some embodiments.

FIG. 1 illustrates a computer system 1000 constructed in accordance with at least some embodiments. Computer system 1000 comprises a printed circuit board or motherboard 100 upon which various electrical components are coupled. In particular, the motherboard 100 comprises a processor socket 101 within which a processor 102 couples. The processor 102 couples to a main memory array 104, and various other peripheral computer system components, through integrated host bridge 106. The processor 102 couples to the host bridge 106 by way of a host bus 108, or the host bridge 106 may be integrated into the processor 102. Thus, the computer system 1000 may implement other bus configurations or bus-bridges, in addition to, or in place of, those shown in FIG. 1.

Main memory array 104 couples to the host bridge 106 through a memory bus 110. The host bridge 106 comprises a memory control unit that controls transactions to the main memory 104 by asserting control signals for memory accesses. The main memory array 104 functions as the working memory for the processor 102 and comprises a memory device or array of memory devices in which programs, instructions and data are stored. The main memory array 104 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM).

In some embodiments the computer system 1000 comprises a graphics controller or video driver 112 that couples to the host bridge 106 by way of a Peripheral Components Interconnect (PCI) Express (PCI-E) bus 114, or other suitable type of bus. Alternatively, the video driver 112 may couple to the primary expansion bus 116 or one of the secondary expansion buses (e.g., PCI bus 118). The video driver 112 may further couple to a display device which may comprise any suitable electronic display device upon which any image or text can be represented. In some embodiments, the video driver 112 is integrated with the motherboard 100, and in other embodiments the video driver 112 is an add-in card that is physically and electrically coupled to the motherboard 100.

Still referring to FIG. 1, the computer system 1000 also comprises a second bridge 122 that bridges the primary expansion bus 116 to various secondary expansion buses, such as PCI bus 118 and a low pin count (LPC) bus 120. In accordance with some embodiments, the bridge 122 comprises an Input/Output Controller Hub (ICH) manufactured by Intel Corporation of Chandler, Ariz. In the embodiments shown in FIG. 1, the primary expansion bus 116 comprises a Hub-link bus, which is a proprietary bus of the Intel Corporation. However, computer system 1000 is not limited to a chipset manufactured by Intel, and thus other suitable chipsets, and therefore other suitable buses between the bridge devices, may be equivalently used.

A firmware hub 124 couples to the ICH 122 by way of the LPC bus 120. The firmware hub 124 comprises read-only memory (ROM) which contains software programs executable by the processor 102. The software programs comprise not only programs to implement basic input/output system (BIOS) commands, but also instructions executed during and just after power-on self tests (POST) procedures. The POST procedures perform various functions within the computer system before control of the computer system is turned over to the operating system.

A super input/output (I/O) controller 126 couples to the ICH 122 and controls many computer system functions, for example interfacing with various input and output devices such as a keyboard and a pointing device (e.g., mouse), various serial ports and floppy drives. The super I/O controller 126 is often referred to "super" because of the many I/O functions it performs.

Computer system 1000 further comprises a power supply 130, such as a switching power supply, that electrically couples to the motherboard 100 by way of a connector 132 (and corresponding connector on the cable which is not shown so as not to unduly complicate the figure). The power supply 130 produces a variety of power signals with different direct current (DC) voltages, such as +12 Volt (V), −12 V, +5 V, −5V and +3.3V. The various power signals provided from the power supply 130 to the motherboard 100 through the connector 132 are divided into groups: main power signals 134; and an auxiliary power signal 136. The main power signals 134 (e.g., +−12V, +−5V and +3.3V) may be selectively powered-on and powered-off within the power supply. The auxiliary power signal 136 (e.g., +5V) remains powered-on when the power supply 130 is coupled to alternating current (AC) power, and thus the auxiliary power signal 136 remains powered-on even when the main power signals 132 are powered-off. For example, in some powered-off modes (i.e., soft off or sleep states), all the main power signals are powered-off, yet the computer system powers a small subset of devices from the auxiliary power signal to monitor for wake indications from the user (e.g., keyboard activity, mouse activity or local area network (LAN) activity).

The BIOS of the computer system 1000, stored in the ROM of the firmware hub 124, may provide functionality related to loss of AC power by the power supply. In particular, in some computer systems specific actions are taken when AC power to the computer system 1000 (and more particularly the power supply 130) has been lost and then restored. For example, on loss and restore of AC power, the BIOS may be programmed to automatically reboot the computer system. The motherboard 100 implements various devices and/or programs to detect AC power loss. In particular, the motherboard 100 is configured to monitor the auxiliary power signal 136 and assume an AC power loss when the auxiliary power signal 136 is lost (given that the auxiliary power signal 136 should remain powered times when AC power is present).

However, the inventor has found that because of increased power capabilities of power supplies, and increased efficiencies of circuits on motherboards 100 that draw power from the auxiliary power signals 136, in some cases the amount of time a motherboard takes to draw down the auxiliary power signal (i.e., discharge capacitors of the auxiliary power signals) after AC power loss is longer than the AC power loss itself. Thus, the motherboard may not detect that AC power has been lost and restored, and the desired specific action after AC power loss may not take place.

In order to address the potential for the AC power loss having duration less than an amount of time for the motherboard to draw down the auxiliary power signal, motherboard 100 comprises a power dissipation circuit 138 that couples at least to the auxiliary power signal 136. The power dissipation circuit 138 is configured to detect that one or more of the main power signals 134 has been lost (such as triggered by an AC power loss), and responsive to the detection dissipate power from the auxiliary power signal 136. The power dissipation circuit 138 need not fully dissipate the auxiliary power signal 136. In fact, to reduce cost of the power dissipation circuit 138 (e.g., obviate the need for one or more non-integral heat sink components), in some embodiments the power dissipation circuit 138 dissipates power for a predetermined amount of time less than an amount of time amount of time needed to fully discharge the auxiliary power signal 136 in the absence of AC power to the power supply. Thus, while the power dissipation circuit 138 does not fully discharge the auxiliary power signal, the energy dissipated accelerates the amount of time it takes the motherboard to fully discharged the auxiliary power signal.

Because the power dissipation circuit operates for a predetermined amount of time less than an amount of time to fully discharge the auxiliary power signal 136, triggering of the power dissipation circuit 138 in situations where AC power has not been lost is not detrimental. In order to further reduce component count and keep the cost of the power dissipation circuit 138 low, the illustrative power dissipation circuit 138 is not configured to differentiate in every case between loss of the main power signals 134 caused by AC power loss, and powering-off of the main power signals 134 during orderly shut down of the computer system 1000. The result is that the power dissipation circuit 138 of some embodiments may be triggered in situations where AC power has not been lost in order to keep the circuit simple and low cost. However, in other embodiments, the power dissipation circuit 138 may implement the additional components and functionality to trigger only on loss of AC power.

Figure 2:
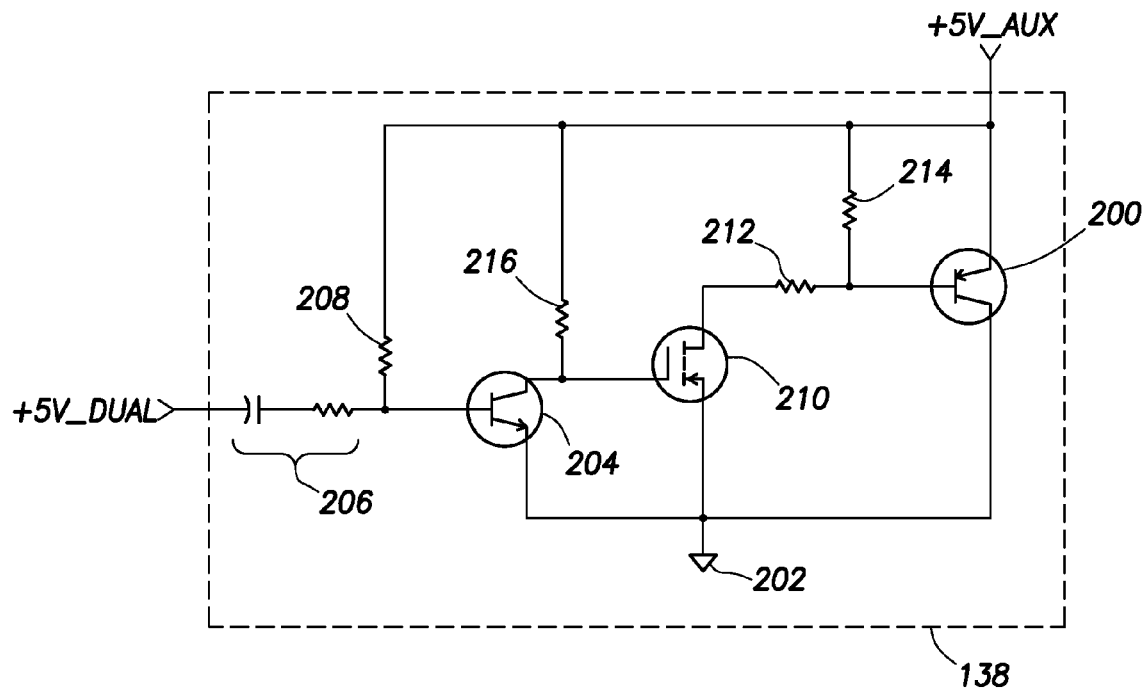
FIG. 2 shows an electrical schematic of a power dissipation circuit in accordance with at least some embodiments.

FIG. 2 illustrates an electrical schematic of the power dissipation circuit 138 in accordance with at least some embodiments. The illustrative power dissipation circuit 138 of FIG. 2 detects that the main power signals have been lost by monitoring the power supply signal applied to a communication port, such as the +5V power signal of a Universal Serial Bus (USB) port (denoted +5V_DUAL). While the illustrative +5V_DUAL is derived from the auxiliary power signals 136, the Super I/O controller 126 (FIG. 1) is configured to power-off the +5V_DUAL signal upon intentional powering-off of the main power signals 134 during transitions of the computer system 1000 to particular powered-off states. The computer system 1000 may also implement various soft-off or sleep states in which the computer system 1000 wakes based on keyboard activity, mouse activity or local area network (LAN) activity, and in these soft-off or sleep states the +5V_DUAL remains powered-on. In cases where loss of the main power signals 134 is a transition to a soft-off or sleep state, and not in response to loss of AC power, the functionality of dissipating power from the auxiliary power signals 136 need not take place. Thus, the +5V_DUAL is a convenient signal to use as indication of loss of the main power signals 134 for purposes of triggering the power dissipation circuit 138.

The illustrative +5V_DUAL signal couples to the base of transistor 204 (such as part no. MMBT3904 NPN transistor available from Fairchild Semiconductor of San Jose, Calif.) by way of a series resistor-capacitor (RC) circuit 206. The base of transistor 204 also couples to the auxiliary power signal (here, a +5V auxiliary power signal denoted as +5V_AUX) through resistor 208. The collector of transistor 204 is coupled the gate of transistor 210 (such as a part no. 2N7002_NL FET available from Fairchild), and the emitter of transistor 204 is coupled to a return 202. The drain of transistor 210 couples the base of transistor 200 by way of a resistor 212, and the source of transistor 210 couples to return 202.

Still referring to FIG. 2, the power dissipation circuit 138 in accordance with the illustrative embodiments dissipates power by way of transistor 200 (such as a part no. PBSS5540Z PNP transistor available from Phillips Semiconductor) coupled between an +5V_AUX and return 202. At and for specific times, discussed more below, the transistor 200 is made conductive, thus shorting current from the +5V_AUX to the return. While transistor 200 is illustrated as a junction transistor, field effect transistors (FETs) may be equivalently used. The transistor 200 need not be driven to saturation when shorting the illustrative +5V_AUX signal, as any conductive mode of the transistor, such as conduction in the active region of the transistor curve, may be used to short the +5V_AUX signal.

The RC circuit 206 and resistor 208 are configured to set the predetermined time that the +5V_AUX is shorted by way of transistor 200. In particular, at times when the +5V_DUAL is powered-on, current flows through resistor 208 (e.g., 169 kilo-Ohms) and into the base of transistor 204, thus making transistor 204 conductive collector-to-emitter. A conductive state of transistor 204 pulls the gate of transistor 210 low, thus making the transistor 210 non-conductive drain-to-source. A non-conductive transistor 210 forces the base and emitter of transistor 200 to effectively the same voltage, thus making transistor 200 non-conductive. When the +5V_DUAL powers-off, capacitor 206 is unable to change its voltage instantaneously and thus the base-to-emitter junction of the transistor is driven negative causing transistor 204 become non-conductive. Electrical current flow through resistor 208 is momentarily diverted from the base of transistor 204, and instead flows into the RC circuit 206. During the period of time when the electrical current is diverted into the RC circuit 206, transistor 204 remains non-conductive, and thus the gate of transistor 210 is pulled high through resistor 216. When the gate of transistor 210 is high, transistor 210 becomes conductive causing the base current to flow in transistor 200, and the base current of transistor 200 makes transistor 200 conductive. The conductive transistor 200 shorts the +5V_AUX to the return 202.

As the capacitor of the RC circuit 206 charges (still considering the +5V_DUAL low), current flow momentarily diverted into the RC circuit 206 charges the capacitor of RC circuit 206 until current begins to again flow into the base of transistor 204, and the change of state propagates through the circuit, making transistor 200 again non-conductive. Thus, the RC circuit 206 and resistor 208 sets the predetermined time that the transistor 200 shorts the +5V_AUX signal.

In accordance with at least some embodiments, the period of time that the transistor 200 shorts the +5V_AUX signal is approximately two seconds. The illustrative two seconds for these embodiments is set based on two criteria. First, significant heat is generated in the transistor 200 when shorting the +5V_AUX, and the predetermined time is selected to ensure the transistor 200 does not overheat. In some embodiments, again to keep the component count and cost of the power dissipation circuit 138 low, a separate, non-integral heat sink is not used in conjunction with transistor 200. Thus, the predetermined time is set (by the RC circuit 206 and resistor 208) to ensure that no damages occurs to the transistor 200 during the shorting. Stated otherwise, in some embodiments the predetermined amount of time is selected to be less than an amount of time the transistor 200 can operate in the conductive mode in the absence a non-integral heat sink without overheating. The second criteria for selecting the predetermined time is the amount of time needed to fully discharge the auxiliary power signal 136. In some embodiments, the predetermined time is selected to ensure that the auxiliary power signal 136 is fully discharged within 20 seconds or less from AC power loss, and in some cases 10 seconds or less.

Figure 3:
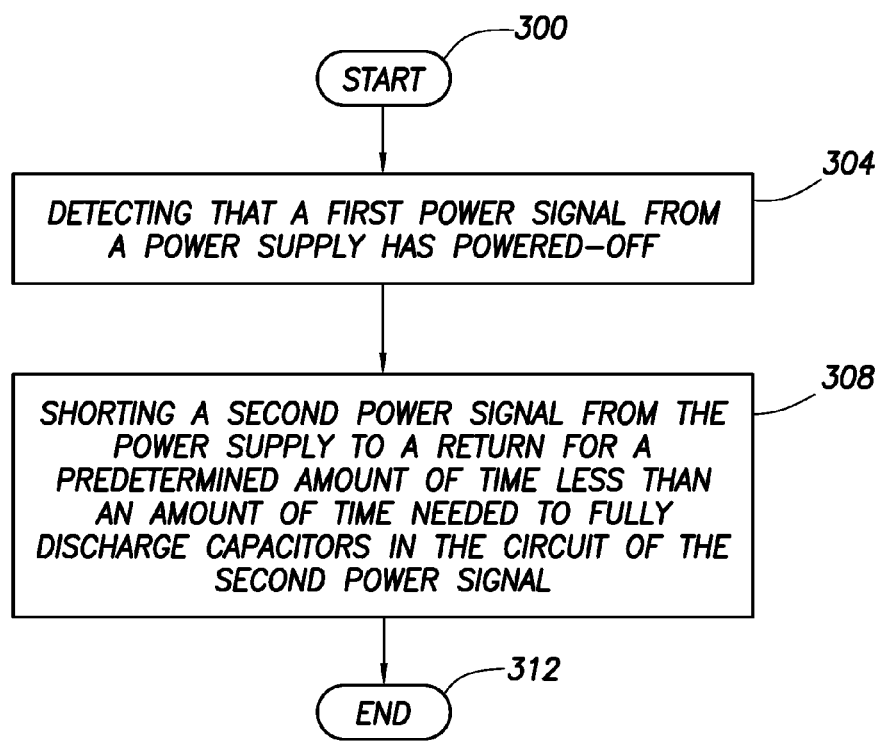
FIG. 3 shows a method in accordance with at least some embodiments.

FIG. 3 illustrates a method in accordance with at least some embodiments. In particular, the method starts (block 300) and proceeds to detecting that a first power signal from a power supply has powered-off (block 304). For example, the method may detected that one or more of the power signals of the main power signals have powered-off (whether selectively powered-off, or powered-off based on loss of AC power). In some cases, the detecting is by a circuit on a motherboard of a computer system. Responsive to the detecting that the first power signal has powered-off, the method moves to shorting a second power signal from the power supply to a return for a predetermined amount of time less than an amount of time needed to fully discharge capacitors in the circuit of the second power signal (block 308), and the method ends (block 312). In some cases, the shorting is by way of a junction transistor, and in other cases the shorting is by way of FET. In either case, the shorting by the transistor may be with the transistor in either the active region or saturation region of operation.

The above discussion is meant to be illustrative of the principles and various embodiments of the present invention. Numerous variations and modifications will become apparent to those skilled in the art once the above disclosure is fully appreciated. For example, specific junction transistors and FETs are illustrated in the power dissipation circuit 138; however, with appropriate circuitry FET's may be used in place of junction transistors, and junction transistors may be used in place of FETs. It is intended that the following claims be interpreted to embrace all such variations and modifications.

What is claimed is:

1. A motherboard comprising:
   a printed circuit board configured to couple to a main processor, and the printed circuit board configured to couple to a main power signal and an auxiliary power signal of a power supply; and
   a power dissipation circuit on the printed circuit board, the power dissipation circuit configured to:
   detect that the main power signal has powered-off; and responsive to the detection
   dissipate power from the auxiliary power signal for a predetermined amount of time less than an amount of time needed to fully discharge the auxiliary power signal in the absence of alternating current (AC) power to the power supply;
   wherein the power dissipation circuit further comprises a transistor coupled between the auxiliary power signal and a return, and wherein the transistor, in a conductive mode of operation, shorts the auxiliary power signal to the return;
   wherein the power dissipation circuit dissipates power from the auxiliary power signal for the predetermined time which is less than an amount of time the transistor can operate in a conductive mode in the absence a non-integral heat sink.

2. The motherboard of claim 1 wherein the conductive mode is at least one selected from the group consisting of: conduction in an active region; and conduction in a saturation region.

3. The motherboard of claim 1 wherein the transistor is at least one selected from the group consisting of: a junction transistor; and a field effect transistor.

4. The motherboard of claim 1 wherein the power dissipation circuit is configured to dissipate power for the predetermined amount of time such that an amount of time to fully discharge auxiliary power signal is 20seconds or less.

5. The motherboard of claim 1 wherein the power dissipation circuit is configured to dissipate power for the predetermined amount of time such that an amount of time to fully discharge auxiliary power signal is 10seconds or less.

6. The motherboard of claim 1 wherein the power dissipation circuit is configured to detect the main power signal has powered-off by monitoring a power signal for a communication port.

7. A method comprising:
   detecting that a first power signal from a power supply has powered-off; and
   responsive to the detecting
   shorting a second power signal from the power supply to a return for a predetermined amount of time less than an amount of time needed to fully discharge capacitors in the circuit of the second power signal;
   wherein shorting further comprises shorting by a transistor operated in a conductive mode for a predetermined amount of time being less than an amount of time the transistor can operate in the conductive mode in the absence a non-integral heat sink without overheating.

8. The method of claim 7 wherein detecting further comprises detecting by a circuit on a motherboard of a computer system that the first power signal of a main power signals has powered-off.

9. The method of claim 7 wherein shorting further comprises shorting through a transistor operating in at least one selected from the group consisting of: an active region; and a saturation region.

10. The method of claim 7 wherein shorting further comprises shorting for the predetermined amount of time such that an amount of time to fully discharge the capacitors is 20seconds or less.

11. The method of claim 7 wherein shorting further comprises shorting for the predetermined amount of time such that an amount of time to fully discharge the capacitors is 10seconds or less.

\* \* \* \* \*